(12) United States Patent
Izu et al.

(10) Patent No.: US 7,489,498 B2
(45) Date of Patent: Feb. 10, 2009

(54) CAPACITORS AND METHODS FOR MANUFACTURING THE SAME

(75) Inventors: Hiroaki Izu, Hirakata (JP); Takahisa Iida, Hirakata (JP); Mutsumi Yano, Hirakata (JP); Mamoru Kimoto, Hirakata (JP)

(73) Assignee: Sanyo Electric Co., Ltd., Moriguchi, Osaka (JP)

( * ) Notice: Subject to any disclaimer, the term of this patent is extended or adjusted under 35 U.S.C. 154(b) by 270 days.

(21) Appl. No.: 11/511,470

(22) Filed: Aug. 29, 2006

(65) Prior Publication Data

US 2007/0047179 A1    Mar. 1, 2007

(30) Foreign Application Priority Data

Aug. 30, 2005 (JP) .............................. 2005-249372

(51) Int. Cl.
 *H01G 9/00* (2006.01)

(52) U.S. Cl. ...................... 361/523; 361/525; 361/528; 361/529; 361/516; 361/519; 29/25.01; 29/25.03

(58) Field of Classification Search ................ 361/525, 361/523, 528, 529, 516–519, 302–305, 508–512; 29/25.01, 25.03

See application file for complete search history.

(56) References Cited

U.S. PATENT DOCUMENTS

| | | | | |
|---|---|---|---|---|
| 5,654,869 | A * | 8/1997 | Ohi et al. ..................... | 361/540 |
| 6,128,180 | A * | 10/2000 | Araki et al. .................. | 361/525 |
| 6,324,051 | B1 * | 11/2001 | Igaki et al. ................... | 361/523 |
| 6,771,488 | B2 * | 8/2004 | Takagi et al. ................. | 361/523 |
| 6,954,351 | B2 * | 10/2005 | Konuma et al. .............. | 361/523 |
| 7,233,484 | B2 * | 6/2007 | Takatani et al. .............. | 361/525 |

FOREIGN PATENT DOCUMENTS

| | | |
|---|---|---|
| JP | 06-034986 | 2/1994 |
| JP | 07-082533 | 3/1995 |
| JP | 11-345703 | 12/1999 |
| JP | 2002-134361 | 5/2002 |

\* cited by examiner

*Primary Examiner*—Nguyen T Ha
(74) *Attorney, Agent, or Firm*—NDQ&M Watchstone LLP

(57) ABSTRACT

A capacitor element comprises an anode, a dielectric layer formed on the anode, an electrolyte layer formed on the dielectric layer, and a cathode formed on the electrolyte layer. On the cathode formed by the surface of the capacitor element, a conductive adhesive layer containing silver particles and an organic silane layer made from aminopropyltriethoxysilane (APTES) are sequentially formed, and the cathode and a cathode terminal are connected through the conductive adhesive layer and the organic silane layer. In addition, an anode terminal is connected to an anode lead which exposed from the anode by welding.

19 Claims, 5 Drawing Sheets

RELATED ART

CAPACITORS AND METHODS FOR MANUFACTURING THE SAME

CROSS REFERENCE TO RELATED APPLICATIONS

This application claims priority from prior Japanese Patent Application No. P2005-249372 filed on Aug. 30, 2005, the entire contents of which are incorporated herein by reference based on 35USC119.

BACKGROUND OF THE INVENTION

1. Field of the Invention

This invention relates to capacitors and manufacturing method thereof, and in particular concerns connection of electrode terminals and electrodes of capacitor elements and a manufacturing method thereof.

2. Description of Related Art

Japanese Published Unexamined Application No.2002-134361 discloses capacitors having electrode terminals that respectively connect to a pair of electrodes of a capacitor element. FIG. 9 shows a sectional view of a conventional solid electrolytic capacitor. A solid electrolytic capacitor of related art is explained in this figure. The solid electrolytic capacitor shown in FIG. 9 comprises a capacitor element 105 that has an anode 101, a dielectric layer 102 formed on the anode 101, an electrolyte layer 103 formed on the dielectric layer 102, and a cathode 104 formed on the electrolyte layer 103.

The anode 101 includes an anode lead 101a and a plate-shaped base body 101b that is made of a porous sintered body such as tantalum particles and is formed to expose a part of the anode lead 101a on the anode lead 101a.

The dielectric layer 102 is made from oxides such as tantalum oxide and is shaped to cover around the base body 101b. In addition, the dielectric layer 102 is formed by anodic oxidation of the anode 101.

The electrolyte layer 103 is made from manganese dioxide or conductive polymers such as polypyrrole and is shaped to cover around the dielectric layer 102.

The cathode 104 includes a first conductive layer 104a with compounds of carbon particles such as graphite, and is shaped to cover around the electrolyte layer 103, and a second conductive layer 104b with compounds of silver particles and is shaped to cover around the first conductive layer 104a. In addition, the first conductive layer 104a is formed by applying carbon paste to the electrolyte layer and drying the carbon paste. The second conductive layer 104b is formed by applying silver paste to the first conductive layer 104a and drying the silver paste.

A conductive adhesive layer 106 is formed on the upper surface of the cathode 104 of the capacitor element 105. The cathode 104 and cathode terminal 108 are connected through the conductive adhesive layer 106. By applying silver paste to the cathode 104 and drying the silver paste, the conductive adhesive layer 106 is formed of silver particles. Also, an anode terminal 109 is connected to the exposed anode lead 101a from the anode 101 by welding. In addition, a cathode terminal 108 and an anode terminal 109 are formed in nickel, copper and these alloys. In particularly, on the surface of the cathode terminal 108, which is connected to the cathode 104 of the capacitor element 105 through the conductive adhesive layer 106, a silver plating layer 108a is formed to improve adhesive properties of the conductive adhesive layer 106 and the cathode terminal 108.

Furthermore, a mold resin 110 is formed around the capacitor element 105, the cathode terminal 108, and the anode terminal 109 so as to expose an end of both the cathode terminal 108 and the anode terminal 109 to the outside.

However, in a conventional solid electrolytic capacitor as described above, contact resistance between the conductive adhesive layer 106 and the cathode terminal 108 becomes high. Further, the equivalent series resistance (ESR) becomes particularly high at high frequencies.

SUMMARY OF THE INVENTION

This invention alleviates the problems described above. An object of the present invention is to provide capacitors of reduced ESR and methods of manufacturing such capacitors of reduced ESR. To achieve the object, a capacitor according to an embodiment comprises a capacitor element having a dielectric layer between a pair of electrodes, and an electrode terminal connected to an electrode. The electrode and the electrode terminal are connected through a conductive adhesive layer formed on the electrode and an organic silane layer formed on the conductive adhesive layer.

In the capacitor described above, the conductive adhesive layer and the cathode terminal are connected through the organic silane layer, as a chemical bond between the organic silane layer and the conductive adhesive layer is formed. This enhances the adhesive property of the conductive adhesive layer and the electrode terminal. As a result, contact resistance between an electrode and an electrode terminal can be reduced. This provides a capacitor of smaller ESR at high frequencies.

Preferably, the conductive adhesive layer of the capacitor above, contains silver particles, and the organic silane layer contains at least one organic silane selected from the group consisting of aminopropyltriethoxysilane (APTES) and mercaptopropyltrimethoxysilane (MPTMS).

In this way, greater adhesive property can be obtained, because the amino group of APTES and the mercapto group of MPTMS strongly bind silver.

A method of manufacturing capacitors according to a second aspect of the present invention includes a process of forming a capacitor element having a dielectric layer between a pair of electrodes, and a process of connecting an electrode and a electrode terminal through a conductive adhesive layer on the electrode and a organic silane layer formed on the conductive adhesive layer.

In accordance with the method of this second aspect, as described above, the electrode and the electrode terminal are connected through the conductive adhesive layer formed on the electrode and the organic silane layer formed on the conductive adhesive layer. The conductive adhesive layer and the cathode terminal are connected through the organic silane layer, and chemical bonds between the organic silane layer and the conductive adhesive layer consequently are created. This enhances the adhesive property of the conductive adhesive layer and the electrode terminal, which reduces contact resistance between an electrode and an electrode terminal. As a result, capacitors of smaller ESR at high frequencies easily can be produced.

Preferably, the organic silane layer is formed by immersing the electrode terminal in a water solution that contains an organic silane.

In this way, the adhesive property of the conductive adhesive layer and the electrode terminal is further enhanced because the organic silane layer easily can be formed on a surface of the electrode terminal evenly.

In addition, "a capacitor element" broadly includes an electrolytic capacitor element that uses aluminum or tantalum, a solid electrolytic capacitor element which uses tantalum, niobium, or titanium, a ceramic capacitor element, an electric double layer capacitor element and such.

DETAILED DESCRIPTION OF EMBODIMENTS

Figure 1:
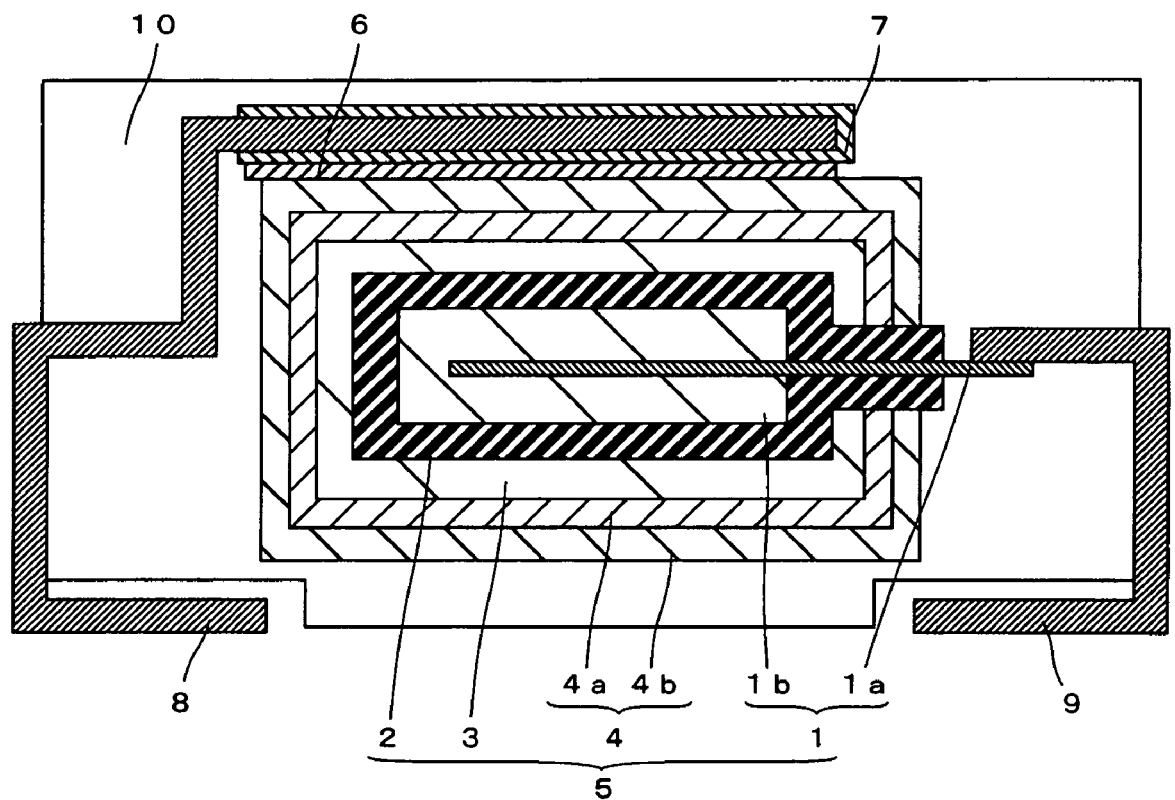
FIG. 1 shows a sectional view of a representative structure of a solid electrolytic capacitor according to embodiment 1.

Various embodiments of the present invention will be described with reference to the accompanying drawings. The same or similar reference numerals are applied to the same or similar parts and elements throughout the drawings, and the description of the same or similar parts and elements will be omitted or simplified.

Embodiment 1

FIG. 1 shows a sectional view of a representative structure of a solid electrolytic capacitor according to embodiment 1 of the present invention. Referring to FIG. 1, structure of the solid electrolytic capacitor of embodiment 1 is explained. As shown in FIG. 1, the solid electrolytic capacitor of embodiment 1 comprises a capacitor element 5 having an anode 1, a dielectric layer 2 formed on the anode 1, an electrolyte layer 3 formed on the dielectric layer 2, and a cathode 4 formed on the electrolyte layer 3. The anode 1 includes an anode lead 1a made from niobium, and a rectangular solid-shaped base body 1b formed to expose a part of the anode lead on the anode lead 1a. The rectangular solid-shaped base body 1b is a porous sintered body of niobium particles having an average particle size of about 2 μm. A dimension of the base body 1b used in this embodiment is about 3.3 mm×about 2.7 mm×about 1.7 mm. In addition, the anode 1 is one example of "an electrode". The dielectric layer 2 is made from niobium oxide and is shaped to cover the base body 1b. The electrolyte layer 3 is made from polypyrrole and is shaped to cover the dielectric layer 2. The cathode 4 includes a film of about 10 μm thickness of a first conductive layer 4a with compounds of graphite particles having about 5 μm to 6 μm average particle size and is shaped to cover the electrolyte layer 3, and about 10 μm film thickness of a second conductive layer 4b with compounds of silver particles of about 3 μm to 4 μm average particle size and is shaped to cover the first conductive layer 4a. In addition, the cathode 4 is one example of "an electrode".

A conductive adhesive layer 6, which contains silver particles having about 3 μm to 4 μm average particle size, is formed on the upper surface of the cathode 4 of the capacitor element 5. Also, an organic silane layer 7 made from APTES is formed on the conductive adhesive layer 6. And, the cathode 4 and a cathode terminal 8 containing copper of about 0.1 mm thickness are connected through the conductive adhesive layer 6 and the organic silane layer 7. An anode terminal 9 containing copper of about 0.1 mm thickness is connected to the exposed anode lead 1a from the anode 1 by welding. In addition, the cathode terminal 8 and the anode terminal 9 are examples of "an electrode terminal".

Moreover, a mold resin 10 is formed around the capacitor element 5, the cathode terminal 8, and the anode terminal 9 so as to expose an end of both the cathode terminal 8 and the anode terminal 9 to outside. By this, the solid electrolytic capacitor in embodiment 1 is produced.

(Method of Manufacturing Solid Electrolytic Capacitor)

FIGS. 2 to 7 show sectional views of formation processes of solid electrolytic capacitor according to embodiment 1 of the present invention. Referring to FIGS. 2 to 7, a manufacturing process of the solid electrolytic capacitor of embodiment 1 is explained.

[Formation of Anode]

Figure 2:
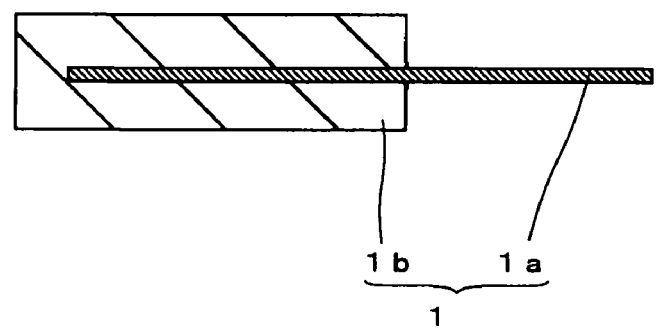
FIGS. 2 to 7 show sectional views of a formation process of a solid electrolytic capacitor by the method of embodiment 1.

At first, as shown in FIG. 2, an anode 1, which includes a porous sintered body (dimension of the rectangular solid: about 3.3 mm×about 2.7 mm×about 1.7 mm) of niobium particles having about 2 μm average particle size, and an anode lead 1a, is formed. The porous sintered body is formed by thermal treatment of a molding body made from the niobium particles which embedded a part of the anode lead 1a in vacuum.

[Formation of Dielectric Layer]

Figure 3:
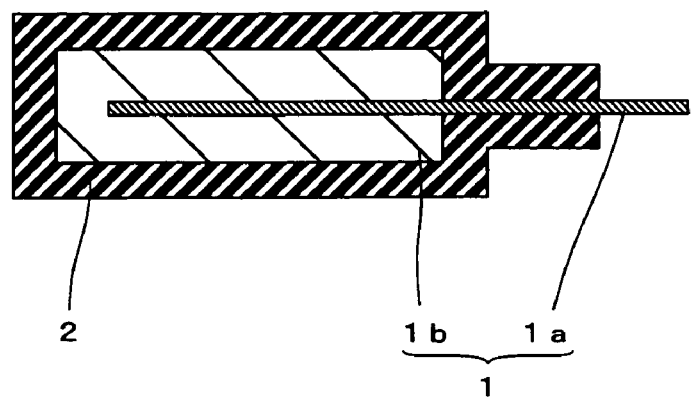

Next, as shown in FIG. 3, anode 1 is oxidized by about 10V constant voltage in a phosphoric acid water solution of about 0.1 wt % which is held at about 60° C. for about 10 hours. The dielectric layer 2 made from niobium oxide is consequently formed to cover around the base body 1b.

[Formation of Electrolyte Layer]

Figure 4:
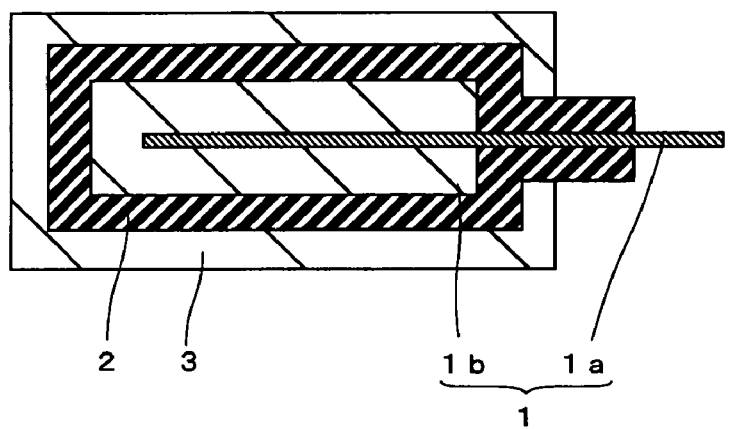

Next, as shown in FIG. 4, the electrolyte layer 3 made from polypyrrole is formed on the dielectric layer 2 to cover around the dielectric layer 2 by polymerizing and so on.

[Formation of Cathode]

Figure 5:
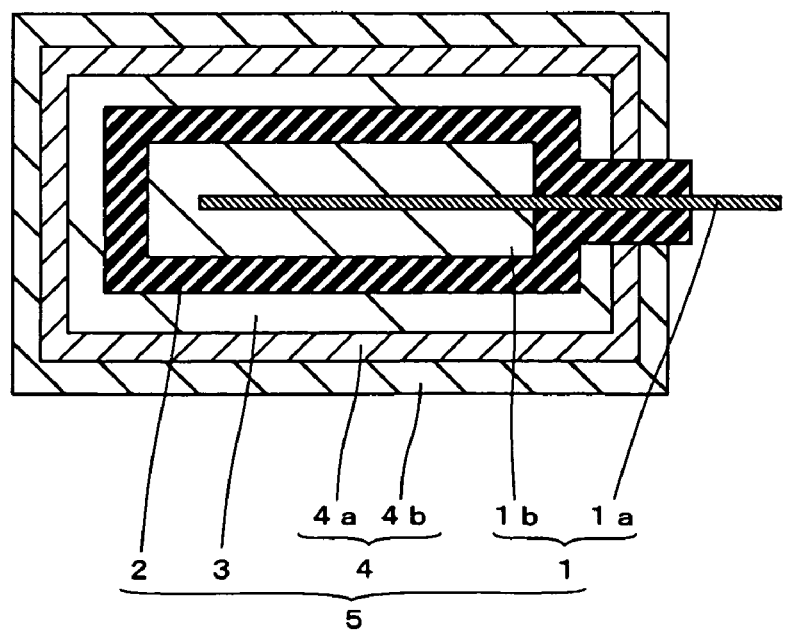

Next, as shown in FIG. 5, graphite paste, which contains graphite particles having about 5 μm to 6 μm average particle size, is applied on the electrolyte layer 3 to cover around the electrolyte layer 3. Then, the first conductive layer 4a of about 10 μm film thickness containing graphite particles is created by drying the applied graphite paste at about 80° C. for about 30 minutes. After that, silver paste, which contains silver particles having about 3 μm to 4 μm average particle size, is applied on the first conductive layer 4a to cover around the first conductive layer 4a. Then, the second conductive layer 4b of about 10 μm film thickness containing silver particles is created by drying the applied silver paste at 160° C. for about 60 minutes. In this way, the cathode 4 including class of the first conductive layer 4a and the second conductive layer 4b is formed to cover around the electrolyte layer 3, and also, the capacitor element 5, which comprises the anode 1, the electrolyte layer 3 formed on the dielectric layer 2, and the cathode 4 formed on the electrolyte layer 3, is produced.

[Connection of Electrode Terminal]

Figure 6:
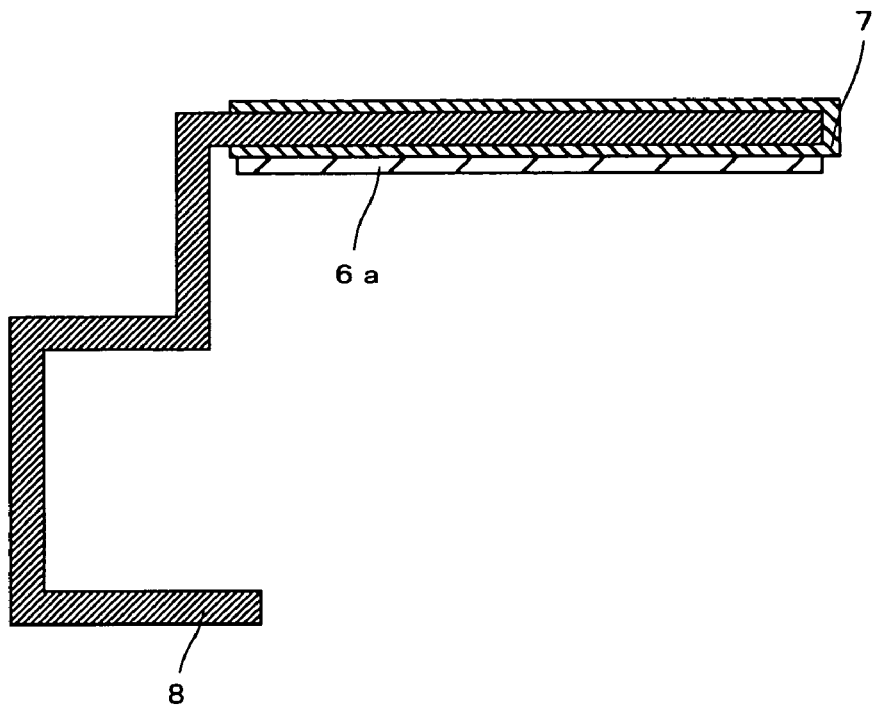

After immersing one end of a cathode terminal 8, which contains copper of about 0.1 mm in thickness, in a water solution containing APTES of about 0.01 wt % for about 10 minutes, the cathode terminal 8 is washed with water. Then, the cathode terminal 8 is dried at 60° C. for about 10 minutes. As shown in FIG. 6, the organic silane layer 7 made from APTES is formed on the cathode terminal 8 to cover one end of the cathode terminal 8. Moreover, about 2 mg conductive adhesive 6a, which contains silver particles having about 3 μm to 4 μm average particle size, is applied to a lower surface of the organic silane layer 7.

Figure 7:
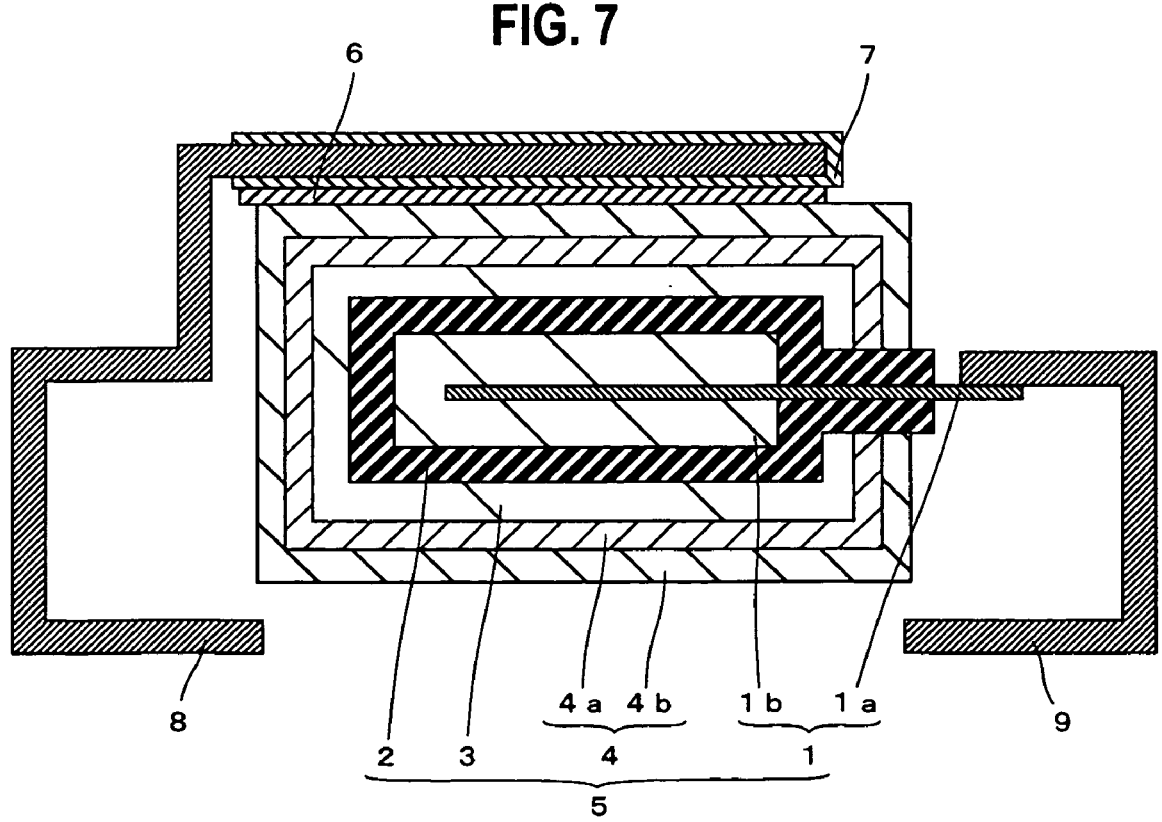

Next, as shown in FIG. 7, the cathode terminal 8 is bonded on the cathode 4 which is formed on a surface of the capacitor element 5 with the conductive adhesive layer 6. Then, the conductive adhesive layer 6 is dried while applying pressure to the cathode terminal 8 to the capacitor element 5. The conductive adhesive layer 6a, which connects the cathode 4 and the organic silane layer 7 on the cathode terminal 8, is formed. Additionally, the anode terminal made from copper of about 0.1 mm in thickness is welded onto the anode lead 1a.

[Mold Process]

Finally, a mold resin 10 is formed around the capacitor element 5, the cathode terminal 8, and the anode terminal 9 so as to expose an end of both the cathode terminal 8 and the anode terminal 9. As shown in FIG. 1, a solid electrolytic capacitor of related to embodiment 1 is produced, respectively.

Embodiments 2 to 6

In embodiments 2 to 6, a solid electrolytic capacitor is produced with the same structure as described in embodiment 1 except for the use of organic silane layers 7 made of mercaptopropyltrimethoxysilane (MPTMS), methyltriethoxysilane (MTES), phenyltriethoxysilane (PTES), vinyltriethoxysilane (VTES), and tetraethoxysilane (TES) instead of use of an organic silane layer 7 made of APTES, respectively.

In embodiments 2 to 6, a solid electrolytic capacitor is produced as in above embodiment 1 except for the use of water solutions of compounds MPTMS, MTES, PTES, VTES, and TES at about 0.01 wt % for immersing an end of the cathode terminal 8 instead of the use of a water solution compound of APTES.

COMPARATIVE EXAMPLE 1

In comparative example 1, a solid electrolytic capacitor is produced as in embodiment 1 except for the use of a cathode terminal without an organic silane layer instead of a cathode terminal that comprises an organic silane layer made of APTES. In other words, the cathode and cathode terminals of comparative example 1 are connected through only a conductive adhesive layer.

COMPARATIVE EXAMPLE 2

In comparative example 2, a solid electrolytic capacitor is produced in a same method as in embodiment 1 except using a cathode terminal which comprises a tin plating layer instead of using a cathode terminal which comprises an organic layer made of APTES. In other words, a cathode and a cathode terminal of comparative example 2 are connected through a conductive adhesive layer formed on the cathode and a tin plating layer formed on the conductive adhesive layer.

[Evaluation]

Next, ESR values of solid electrolytic capacitors of embodiments 1 to 6 and comparative example 1 and 2 are determined at about 100 kHz frequency. Using an LCR meter, ESR values were measured by applying voltage between the cathode terminal 8 and the anode terminal 9. Results are shown in table 1. In addition, table 1 shows normalized measurement results of embodiments 1 to 6 and comparative example 1 from setting a value of 100 for comparative example 2 as a reference standardized measurement result.

TABLE 1

| | Organic Silane Layer | ESR |
|---|---|---|
| Embodiment 1 | APTES | 86 |
| Embodiment 2 | MPTMS | 88 |
| Embodiment 3 | MTES | 91 |
| Embodiment 4 | PTES | 93 |
| Embodiment 5 | VTES | 91 |
| Embodiment 6 | TES | 89 |
| Comparative Example 1 | — | 114 |
| Comparative Example 2 | (Tin Plating Layer) | 100 |

Figure 8:
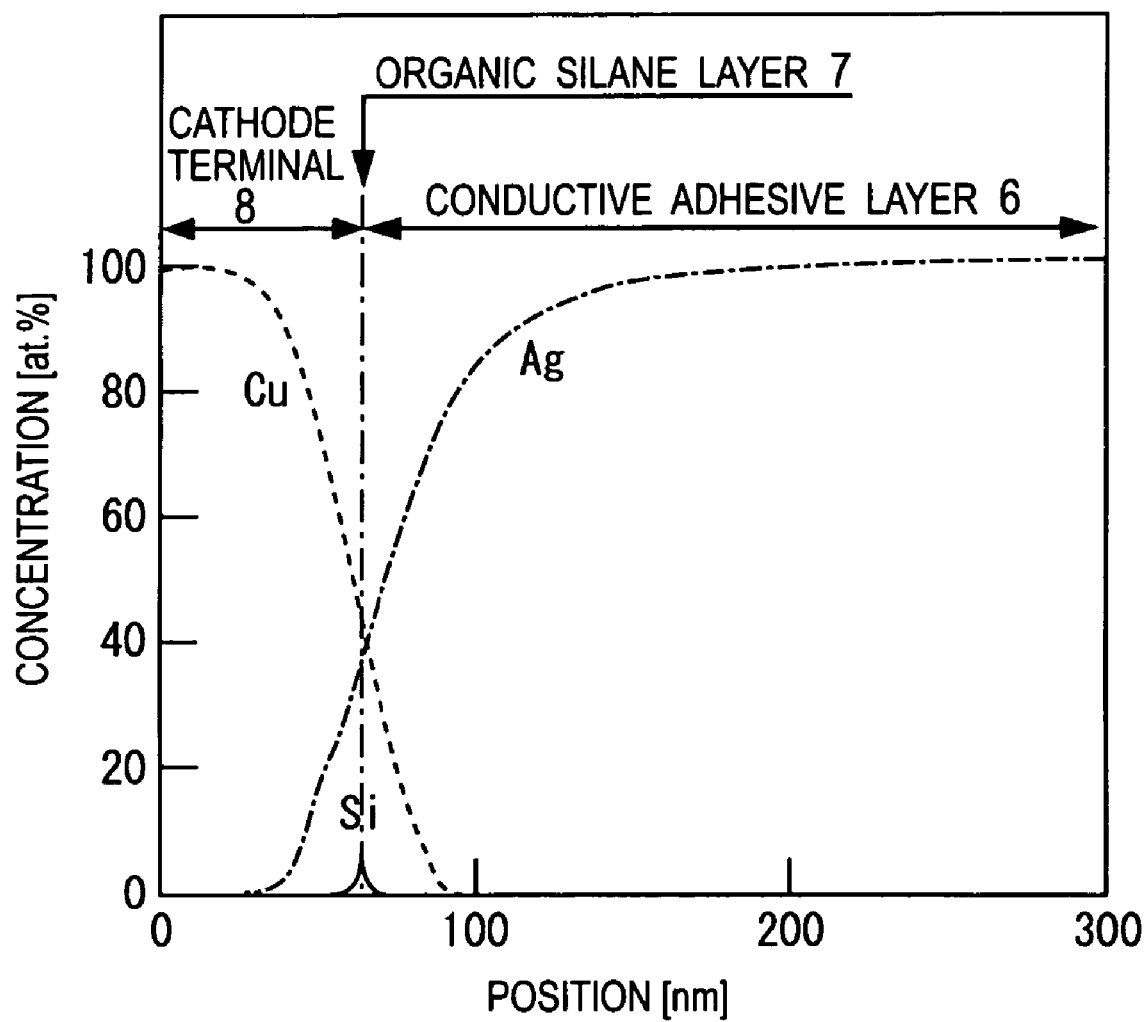
FIG. 8 shows measurement results obtained by energy dispersive X-ray spectrometry (EDX) of the solid electrolytic capacitor of embodiment 1.
Figure 9:
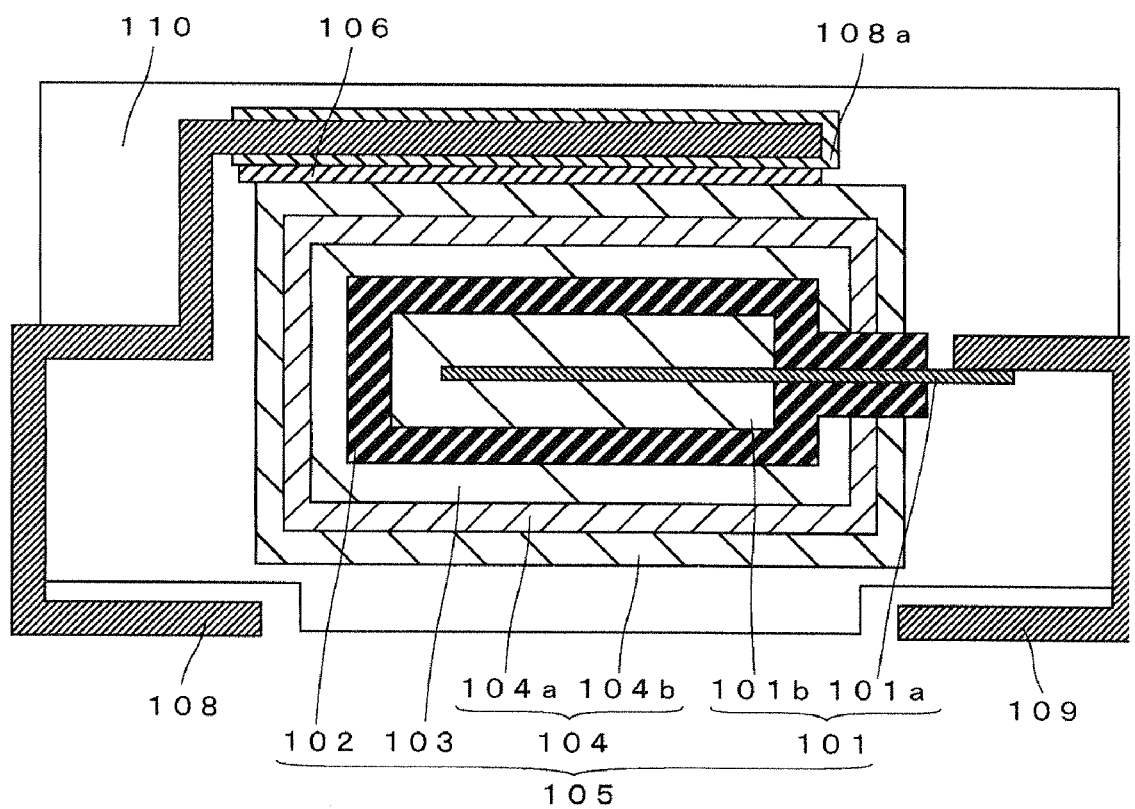
FIG. 9 shows a sectional view of a structure of a conventional solid electrolytic capacitor.

As shown in table 1, solid electrolytic capacitors of embodiments 1 to 6 have lower ESR than solid electrolytic capacitors of comparative example 1 and 2. A solid electrolytic capacitor of embodiment 1 was disassembled after thermal treatment, and elemental analysis carried out for material in the vicinity of interfaces between the cathode terminal 8, the organic silane layer 7, and the conductive adhesive layer 6 as shown in FIG. 1. The chart of FIG. 8 shows characteristic measurements obtained by energy dispersive X-ray spectrometry (EDX) for a solid electrolytic capacitor of embodiment 1. In FIG. 8, the vertical axis indicates concentration (atom %), and the horizontal axis indicates position that points a direction of transformation from inside of the cathode terminal 8 to inside of the conductive adhesive layer 6 in a section direction shown in FIG. 1.

As shown in FIG. 8, in the solid electrolytic capacitor of embodiment 1, a decrease in copper (Cu) concentration and an increase in silver (Ag) concentration were found from a point of around 20 nm to a point of around 150 nm of the horizontal axis. Silicon (Si) also was detected at a point of around 65 nm. Thus, the interface between the cathode terminal 8 and the conductive adhesive layer 6 is seen at a point of around 65 nm, and, a very thin organic silane layer 7 is seen in the interface.

These results indicate that the adhesive property of the conductive adhesive layer 6 and the cathode terminal 8 is enhanced by the formation of the organic silane layer 7 between the conductive adhesive layer 6 and the cathode terminal 8, and this consequently reduces ESR.

For the reduction of ESR, it is seen that APTES and MPTMS in particular are favored for forming the organic silane layer 7. Further, in this regard, the amino group of APTES and mercapto group of MPTMS have respectively strong cohesion with silver particles of the conductive adhesive layer.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes that come within the meaning and range of equivalency of the claims are therefore intended to be embraced therein.

For example, APTES, MPTMS, MTES, PTES, VTES, or TES are used for the organic silane layers 7 according to the above embodiments. However, the present invention may include other methyl silane, phenyl silane, vinyl silane, alkoxy silane, mercapto silane, and amino silane, or, may include at least one organic silane selected from the organic silanes listed above.

The conductive adhesive layers 6 of the above embodiments contain silver particles. However, the present invention may contain other alloy particles such as copper or gold, or may contain mixture of these alloy particles.

By immersing the cathode terminal 8 in a water solution containing an organic silane, and washing and drying it, the organic silane layers 7 of the above embodiments are formed on the cathode terminal 8. However; the present invention may use other methods such as spraying the cathode terminal 8 to put the water solution on for the formation of the organic silane layer 7.

The conductive adhesive layer 6 and the organic silane layer 7 are used only for connection of one electrode and one electrode terminal, in other words, for connection of the cathode terminal 8 and the cathode 4 of the above embodiment. However, the present invention may use a conductive adhesive layer and an organic silane layer for connection of another electrode and another electrode terminal, in other words, for connection of the anode terminal 9 and the anode lead 1a, and also may use a conductive adhesive layer and an organic silane layer for connection of both electrodes and electrode terminals.

The capacitor element 5 of the above embodiments comprises a niobium solid electrolytic capacitor element. However, the present invention may use other materials solid capacitor element with the use of other valves action metal such as tantalum and titanium, or may use other capacitor elements such as an aluminum electrolytic capacitor element, a ceramic capacitor element, and an electric double layer capacitor element.

What is claimed is:

1. A capacitor, comprising:
    a capacitor element having a dielectric layer in between a pair of electrodes;
    an electrode terminal connected to the electrode;
    a conductive adhesive layer formed on the electrode; and
    an organic silane layer formed on the conductive adhesive layer, wherein the electrode and the electrode terminal are connected through the conductive adhesive layer and the organic silane layer.
2. The capacitor as claimed in claim 1, wherein the conductive adhesive layer contains metal particles.
3. The capacitor as claimed in claim 1, wherein the conductive adhesive layer contains silver particles.
4. The capacitor as claimed in claim 1, wherein the conductive adhesive layer contains at least one of metal particles among copper and gold.
5. The capacitor as claimed in claim 1, wherein the conductive adhesive layer contains alloy particles.
6. The capacitor as claimed in claim 1, wherein the organic silane layer contains at least one of organic silanes selected from a group consisting of aminopropyltriethoxysilane (APTES), mercaptopropyltrimethoxysilane (MPTMS), methyltriethoxysilane (MTES), phenyltriethoxysilane (PTES), vinyltriethoxysilane (VTES), and tetraethoxysilane (TES).
7. The capacitor as claimed in claim 1, wherein the organic silane layer contains at least one of organic silanes selected from a group consisting of aminopropyltriethoxysilane (APTES) and mercaptopropyltrimethoxysilane (MPTMS).
8. The capacitor as claimed in claim 1, wherein the organic silane layer contains at least one of methyl silane, phenyl silane, vinyl silane, alkoxy silane, mercapto silane, and amino silane.
9. The capacitor as claimed in claim 1, further comprising:
    a mold resin formed around the capacitor element and the electrode terminal;
    wherein an end of the terminal is exposed outside.
10. A method of manufacturing a capacitor, comprising:
    forming a capacitor element having a dielectric layer in between a pair of electrodes;
    forming an electrode terminal connected to the electrode; and
    forming an organic silane layer on the electrode and a conductive adhesive layer on the organic silane layer to electrically connect the electrode and a electrode terminal.
11. The method as claimed in claim 10, wherein the organic silane layer is formed by immersing the electrode terminal in a water solution containing an organic silane.
12. The method as claimed in claim 10, wherein the conductive adhesive layer contains metal particles.
13. The method as claimed in claim 10, wherein the conductive adhesive layer contains silver particles.
14. The method as claimed in claim 10, wherein the conductive adhesive layer contains at least one of metal particles among copper and gold.
15. The method as claimed in claim 10, wherein the conductive adhesive layer contains alloy particles.
16. The method as claimed in claim 10, wherein the organic silane layer contains at least one of organic silanes selected from a group consisting of aminopropyltriethoxysilane (APTES), mercaptopropyltrimethoxysilane (MPTMS), methyltriethoxysilane (MTES), phenyltriethoxysilane (PTES), vinyltriethoxysilane (VTES), and tetraethoxysilane (TES).
17. The method as claimed in claim 10, wherein the organic silane layer contains at least one of organic silanes selected from a group consisting of aminopropyltriethoxysilane (APTES) and mercaptopropyltrimethoxysilane (MPTMS).
18. The method as claimed in claim 10, wherein the organic silane layer contains at least one of methyl silane, phenyl silane, vinyl silane, alkoxy silane, mercapto silane, and amino silane.
19. The method as claimed in claim 10, further comprising:
    forming a mold resin around the capacitor element and the electrode terminal so as to expose an end of the terminal to outside.

\* \* \* \* \*